United States Patent
Kajita (10) Patent No.: US 6,626,392 B2
(45) Date of Patent: Sep. 30, 2003

(54) MOTOR STATOR WINDING METHOD AND WINDING DEVICE

(75) Inventor: Koh Kajita, Nakatsugawa (JP)

(73) Assignee: Hayashi Industrial Co., Ltd., Gifu (JP)

( * ) Notice: Subject to any disclaimer, the term of this patent is extended or adjusted under 35 U.S.C. 154(b) by 0 days.

(21) Appl. No.: 09/863,087

(22) Filed: May 23, 2001

(65) Prior Publication Data

US 2002/0047065 A1 Apr. 25, 2002

(30) Foreign Application Priority Data

May 25, 2000 (JP) ........................................ 2000-154085

(51) Int. Cl.$^7$ ............................................. H02K 15/085
(52) U.S. Cl. ................................ 242/432.6; 242/432.2; 242/432.3; 242/432.4; 242/439.1
(58) Field of Search ......................... 242/432.2–432.4, 242/432.6, 439.1

(56) References Cited

U.S. PATENT DOCUMENTS

| | | | | | |
|---|---|---|---|---|---|
| 3,381,907 | A | * | 5/1968 | Spanton | 242/432.6 |
| 3,389,865 | A | * | 6/1968 | Stuckey | 242/432.6 |
| 5,273,223 | A | * | 12/1993 | Tsugawa | 242/432.4 |
| 5,596,796 | A | * | 1/1997 | Ruoss | 242/432.2 |
| 5,615,472 | A | * | 4/1997 | Bouman et al. | 112/470.23 |
| 5,755,021 | A | * | 5/1998 | Beakes et al. | 242/432.2 |
| 5,946,792 | A | * | 9/1999 | Beakes | 242/432.4 |
| 5,950,300 | A | * | 9/1999 | Newman | 242/432.2 |
| 6,108,897 | A | * | 8/2000 | Beakes et al. | 242/432.4 |
| 2001/0047580 | A1 | * | 12/2001 | Stratico et al. | |

FOREIGN PATENT DOCUMENTS

| | | | | |
|---|---|---|---|---|
| DE | 3709687 A1 | * | 10/1988 | H01F/41/06 |
| JP | 3049395 | | 9/2000 | |

* cited by examiner

Primary Examiner—Kathy Matecki
Assistant Examiner—Sang K Kim
(74) Attorney, Agent, or Firm—Rabin & Berdo, PC (57) ABSTRACT

A retaining jig 11 is provided comprising a retaining part 15 which moves together with a nozzle 33 performing a cyclic motion, and holds a wire W paid out from the nozzle 33, a displacing means 13 which transports the wire W in the outer circumferential direction of a stator 1 while the wire is held, and a releasing means 15a which releases the hold on the wire W transported to a predetermined position in the outer circumferential direction by the displacing means. A core guide 21 is further disposed which guides the wire W into the stator when the wire W held by the retaining jig 11 is guided in the outer circumferential direction relative to an opening 4 in the stator 1.

8 Claims, 11 Drawing Sheets

MOTOR STATOR WINDING METHOD AND WINDING DEVICE

FIELD OF THE INVENTION

This invention relates to a winding method and winding device for a motor stator which increases motor output by eliminating a region where a wire is not wound.

BACKGROUND OF THE INVENTION

Figure 15:
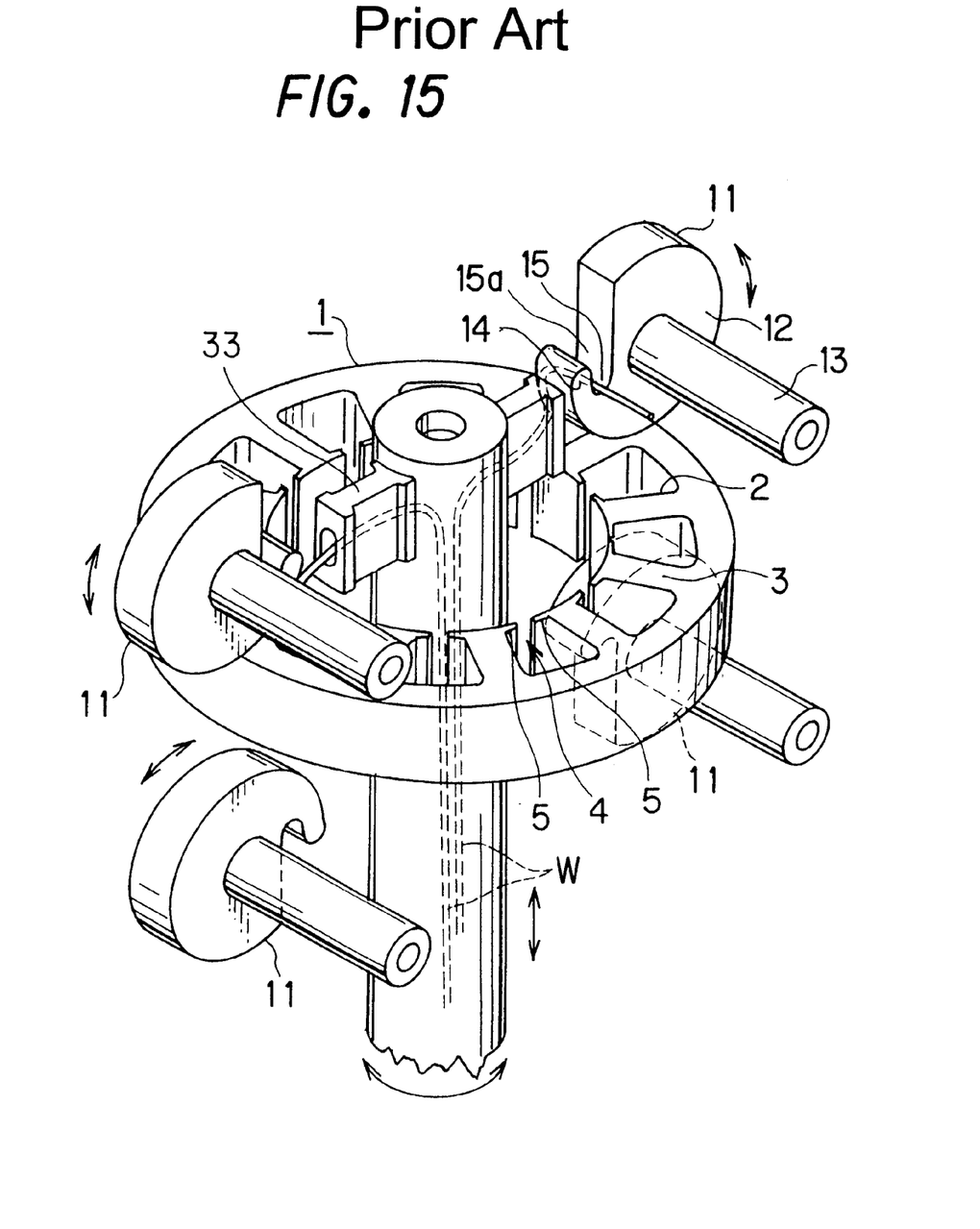
FIG. 15 is a perspective view showing the conventional wire winding device for a motor stator.

The prior art is disclosed in Japanese patent 3049395. As shown in FIG. 15, in this winding device, a cam plate 12 of a retaining jig 11 is disposed in the vicinity of a stator 1. This cam plate 12 comprises a retaining part 15 in which a hook 14 is formed for holding a wire W paid out from a nozzle 33 on its edge, a drive mean for a rotating shaft 13 which displaces to a predetermined position in the outer circumferential direction of the stator 1 when the wire W is held, and an opening part 15a for releasing the hold on the wire W which has displaced to the predetermined position.

To wind the wire in a slot 2 of the stator 1 using this retaining jig 11, the wire W paid out from the nozzle 33 is held, the wire W so retained is displaced in the outer circumferential direction of the stator 1, and the hold on the wire W is released while moving to the predetermined position. The wire is wound by repeating this sequence of operations.

SUMMARY OF THE INVENTION

However, as a slot opening 4 of the stator 1 is extremely narrow from the viewpoint of motor performance improvement, it is difficult to smoothly and surely insert the wire W paid out from the nozzle 33 into the slot 2 from the slot opening 4. Further, when the wire W is inserted into the slot opening 4, the wire W comes in contact with a projection 5 projecting towards the opening 4, and there was a possibility that the wire would be damaged by inserting into the slot 2 as it was rubbed against it.

It is therefore an object of this invention to obtain a compact, high output motor, and provide a wire winding method and winding device for a motor stator which can wind wire by smoothly and surely inserting it into the slot from the slot opening of the motor stator without damaging the wire.

In order to solve the above problems, this invention provides a winding method for a motor stator, comprising; a step to hold a wire supplied from a nozzle which moves in a predetermined path by a retaining jig which moves in synchronism with the nozzle, a step to guide the wire by a retaining jig into an opening in the motor stator to a predetermined position along a core guide facing the opening in a motor stator ,a step to release the wire which is held by the retaining jig, and a step to repeat this sequence of operations.

This invention is further provided a winding device for a motor stator comprising; a retaining jig, comprises a retaining part which moves together with a nozzle which displaces along a predetermined path and retains a wire supplied from the nozzle, transport means which guides the wire thus held in the outer circumferential direction of the motor stator, release means which releases the hold on the wire guided to the predetermined position in the outer circumferential direction of the motor stator , and a core guide which guides the wire into an opening when the wire, held by the retaining jig disposed facing the opening in the motor stator, is guided in the outer circumferential direction of the motor stator.

DESCRIPTION OF THE PREFERRED EMBODIMENTS

Figure 5:
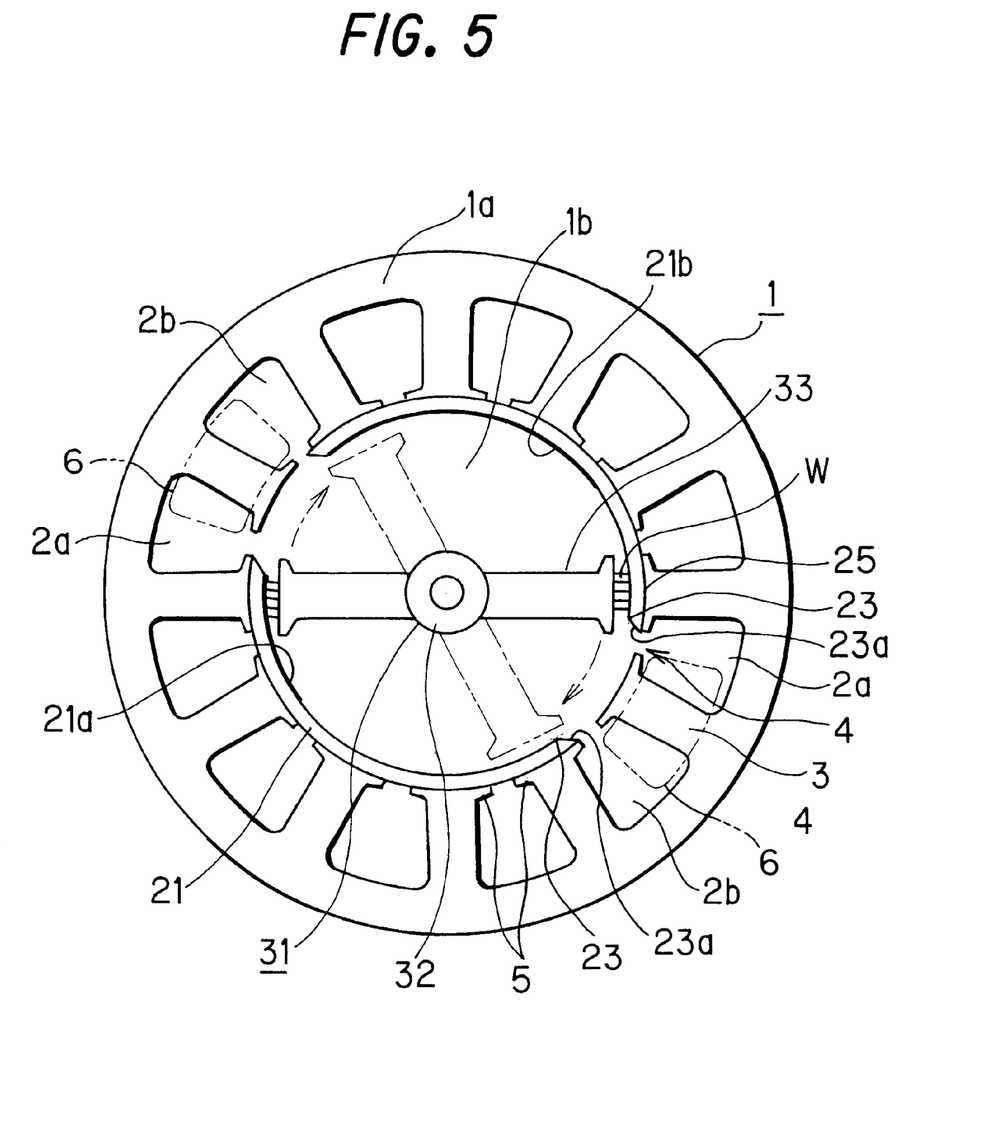
FIG. 5 is a plan view showing the situation when a wire is paid out from a nozzle in FIG. 1.

The wire winding device for a motor stator according to an embodiment of this invention will now be described referring to FIG. 1 to FIG. 5. As shown in FIG. 5 a coil 6 is formed by winding a wire W in a winding part 3 of a motor stator 1. According to FIG. 1, the stator 1 comprise an annular main part 1a, and plural winding parts 3 which project into the main part 1a. The winding parts 3 are formed to have a predetermined length and define a space 1b in the center of the stator 1 in which a feed machine 31 is disposed. The space between adjacent winding parts 3 is shown as a slot 2.

Figure 1:
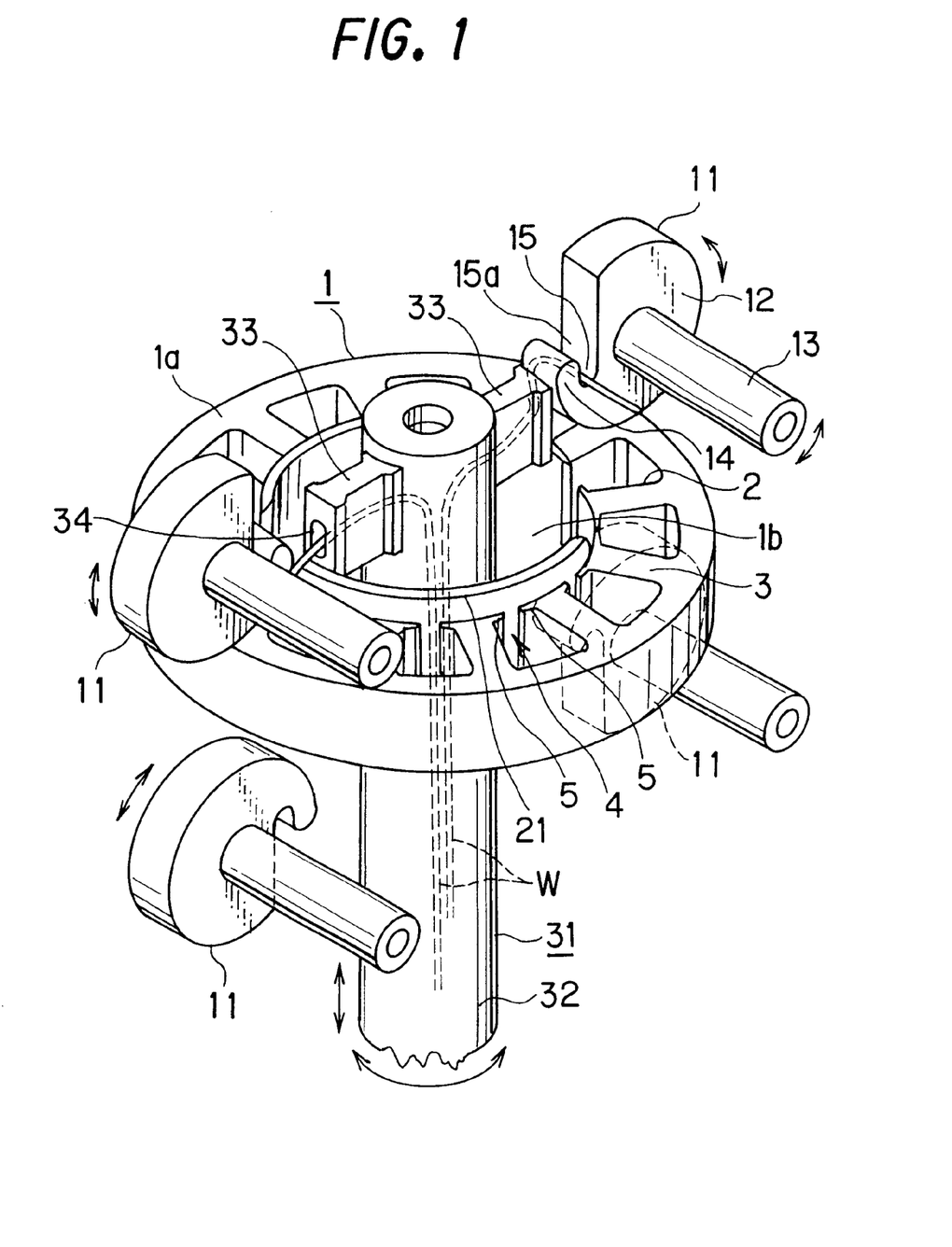
FIG. 1 is a perspective view showing a wire winding device for a motor stator according to an embodiment of this invention.

A shaft 32 of the feed machine 31 is disposed coaxially with the stator 1 and in the central space 1b. Two nozzles 33 on the upper edge of the shaft 32 extend in a radial direction and symmetrically with respect to the center of the shaft 32. The nozzles 33 are set to a length that leaves a slight gap from the slot 2 in the central space 1b of the stator 1.

The shaft 32 is hollow so that the wire W paid out from a bobbin, not shown, can pass through the inside. The wire W is supplied towards the slot 2 of the stator 1 from an opening 34 formed on the edge facing the slot 2 of the nozzle 33. In FIG. 1, only one of the wires W supplied from the nozzle 33 is shown, but normally plural wires are supplied together. Also, in FIG. 1, two of the nozzles 33 are shown, but any number of nozzles may be provided.

The shaft 32 moves up and down in the central space 1b due to a motor means such as a motor or cylinder, not shown, and performs a swinging action rotating back and forth at a predetermined angle around the center axis of the shaft 32. The nozzle 33 is free to move up and down or to the left and right, and moves while tracing a quadrilateral path.

Four of the retaining jigs 11 are disposed separated by a predetermined distance from the slot 2 in the up/down direction of the stator 1. The retaining jigs 11 face the nozzles 33 of the feed machine 31, and are disposed in symmetrical positions relative to the center of the shaft 32.

This retaining jig 11 comprises a cam plate 12, and a rotation shaft 13 fixed in the center of the cam plate 12. Due to the rotation of the rotation shaft 13 by a rotating means, not shown, the cam plate 12 rotates around the circumference of the rotation shaft 13 at a predetermined angle. The hook 14, and a retaining part 15 which holds the wire W, are formed on the edge opposite the nozzle 33 of the cam plate 12 of the retaining jig 11.

Concerning the retaining jig 11 shown on the upper right of FIG. 1, the hook 14 has a shape such that when the cam plate 12 rotates downwards at a predetermined angle due to the rotation of the rotation shaft 13 and the opening part 15a of the retaining part 15 is directed downwards obliquely, the wire W held in the retaining part 15 falls down naturally. The other hooks 14 have shapes which perform identical functions. These retaining jigs 11 make use of the link mechanism and position detecting sensor, and rotate in synchronism with the shaft 32 of the feed machine 31. If the link mechanism is used, the retaining jigs 11 can be made to move together with the shaft 32 surely and economically. Herein, the drive means of the rotation shaft 13 corresponds to the displacing means of the claims, and the opening part 15a of the retaining part 15 corresponds to the release means of the claims.

On the other hand, a projection 5 is formed which extends in the circumferential direction on an inner edge of the winding part 3 of the stator 1. A predetermined clearance as slot opening 4 is formed between the projection 5 and the projection 5 of the adjacent winding part 3. Semicircular tube-like core guides 21 are disposed in pairs concentrically with the stator 1 leaving a clearance from the projection 5, and rotate back and forth around the center of the shaft 32. The core guide 21 may be made to project upwards or downwards from the upper surface and lower surface of the stator 1 by a length which does not interfere with the rotation of the cam plate 12.

Figure 2:
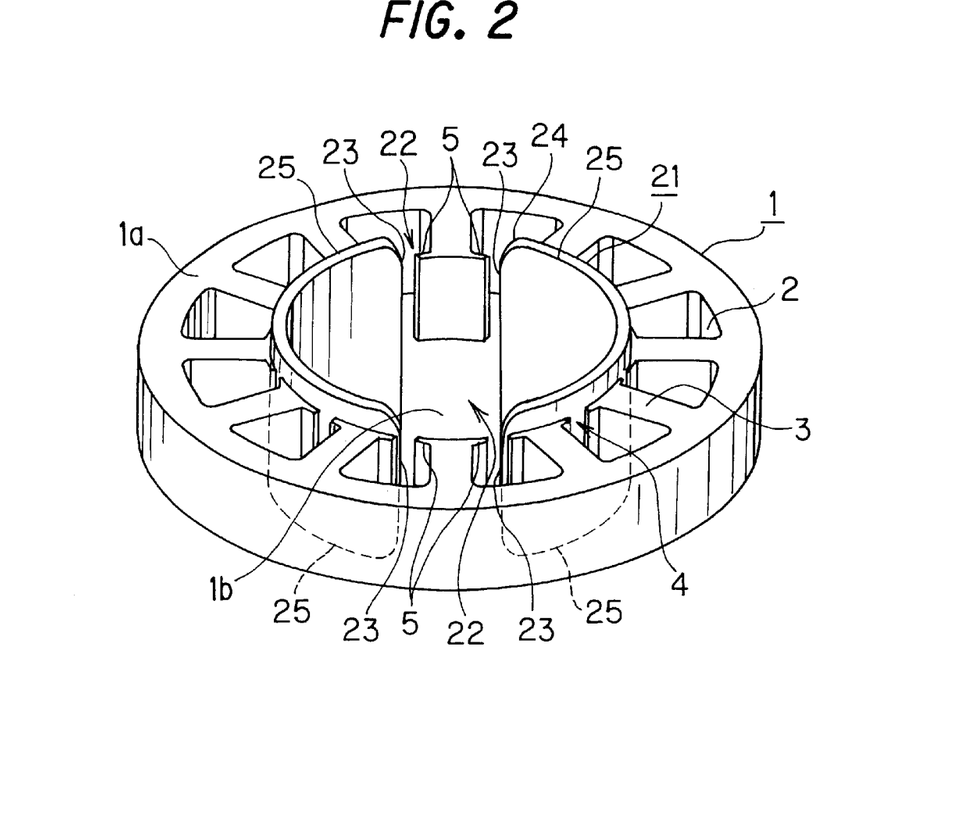
FIG. 2 is a perspective view showing the arrangement of a core guide relative to the stator of FIG. 1.
Figure 3:
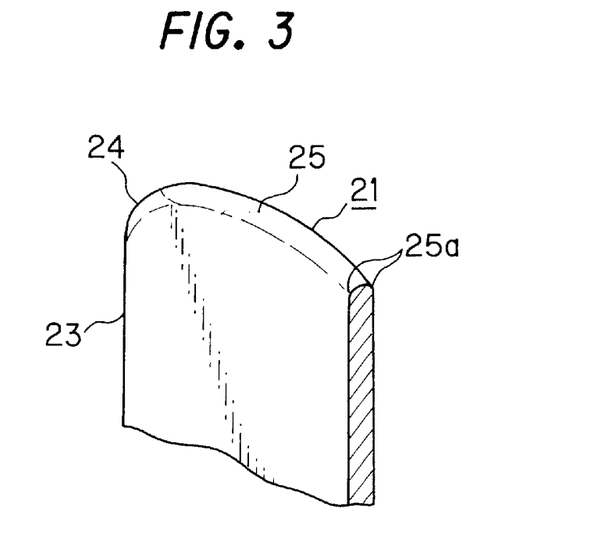
FIG. 3 is a partial enlarged view of the core guide in FIG. 2.
Figure 4:
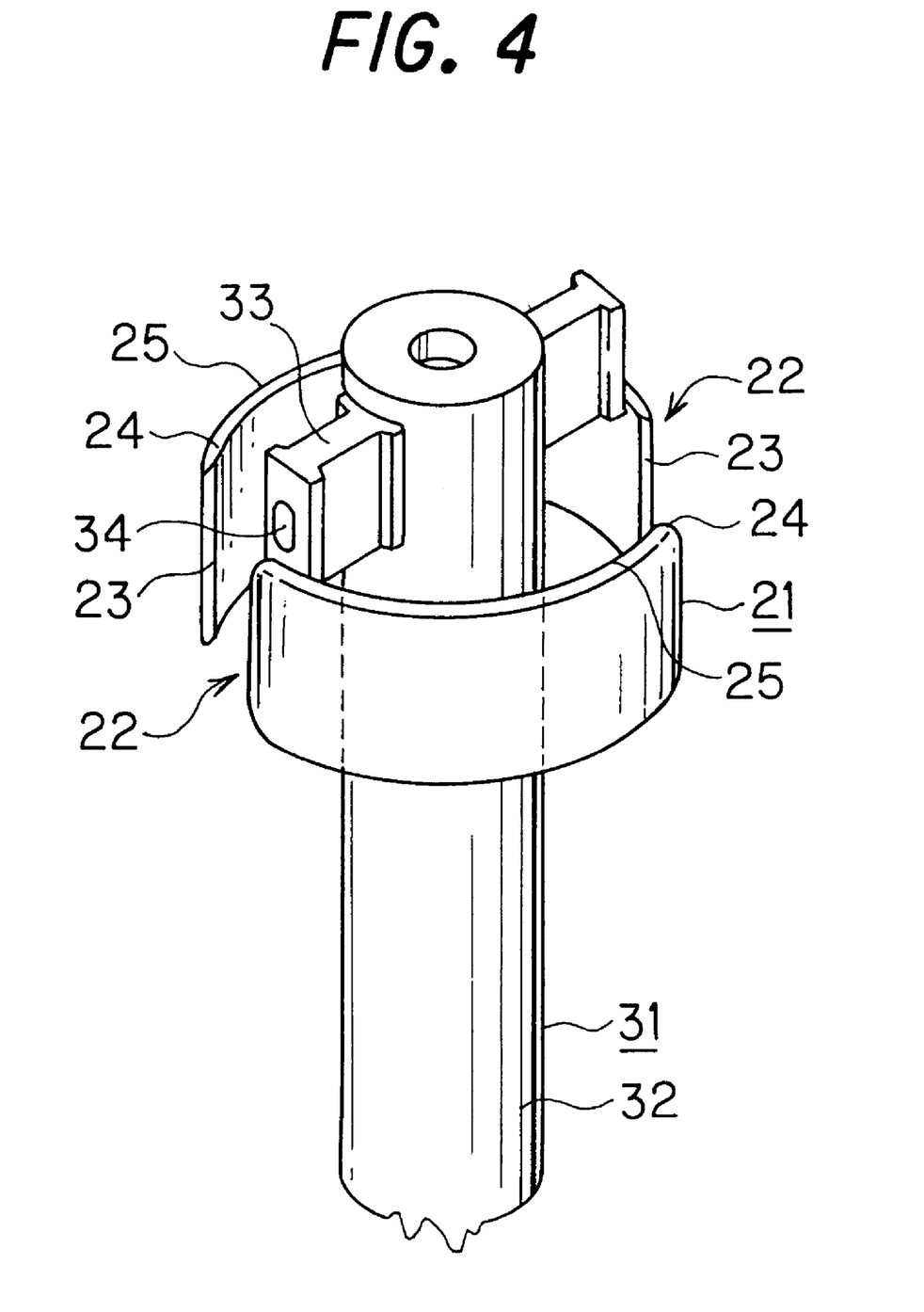
FIG. 4 is a perspective view showing the arrangement of a feed machine and the core guide.

These core guides are disposed on the same circumference. As shown in FIG. 2, an opening part 22 is formed between edge faces 23 of the core guides 21. The directions in the circumferential direction of this opening part 22 are formed in a slightly shorter length than the total length of one winding part 3 and slot openings 4 on both sides, as shown in FIG. 5. An inclined surface 23a which inclines towards the outside of the slot opening 4 is formed on the edge face 23 of the opening part 22, as shown in FIG. 5. The end of the inclined surface 23a slightly projects towards the slot opening 4 from the projection 5 of the winding part 3 on the circumference. As shown in FIG. 2 and FIG. 3, an upward/downward edge piece (curved transition) 24 of the opening part 22 is formed on the inclined surface. This is in order that the wire W can smoothly fall into the slot opening 4 from the upward/downward edge face 25 of the core guide 21, and can easily be inserted into the slot 2. An arc 25a is also formed when both edges of the edge face 25.

Next, the winding operation will be described.

When the wire W is wound, firstly, the wire W is passed through the shaft 32 of the feed machine 31 from a bobbin, not shown, and paid out from a hole 34 of the nozzle 33. The end of the wire W is then held in a predetermined position. Next, in this state, the shaft 32 is rotated around its axis at a predetermined angle in a horizontal direction while moving up and down. The swinging angle of the shaft 32 at this time is set to a stroke amount required for winding one of the winding parts 3. When winding between the plural winding parts 3, it is set to a corresponding angle. The stroke amount of the shaft 32 is set so that the cam plate 12 of the retaining jig 11 moves upward from the upper edge of the core guide 21 to a position where it can hold the wire W paid out from the nozzle 33, and the lower cam plate 12 moves downward from the lower edge of the core guide 21 to a position where it can hold the wire W.

Specifically, the nozzle 33 of the shaft 32 moves down slightly away from the one of the slot openings 4 viewed from the opening part 22 according to the motion of the shaft 32, moves horizontally, moves up slightly away from the other slot opening 4, and moves horizontally to return to its initial position. Due to this closed loop cycle, it traces a quadrilateral path. By repeating this sequence of movements, the wire W is wound on the winding part 3.

When this shaft 32 is performing this sequence of movements, the retaining jig 11 moves as follows. When the nozzle 33 of the shaft 32 is at the starting point of the loop, describing the situation in the case of the retaining jig 11 of the upper right of FIG. 1, for example, when the wire W is paid out, the wire W is caught on the hook 14 and is held by the retaining part 15. Next, when the nozzle 33 moves down, the retaining jig 11 rotates downwards around the rotation shaft 13 as axis accordingly. As a result, the retaining part 15 of the retaining jig 11 also rotates downwards, and moves in the outer circumferential direction of the stator 1. Therefore, the wire W on the retaining part 15 is brought to the outside of the slot 2 while it is still being held. When the retaining jig 11 rotates by a predetermined angle and the wire W comes to a predetermined position, the wire W slips off the retaining jig 11. The wire W falls naturally on the winding part 3 from the opening part 15a of the retaining part 15, and the wire W is guided toward the slot 2 on the side of the main part 1a, i.e., in the outer circumferential direction. When the wire W falls off, the retaining jig 11 rotates back to its original standby state.

Next, the shaft 32 reaches a lowest point, and when the nozzle 33 changes its direction of motion in the horizontal direction under the slot 2, the wire W is held by the retaining part 15 of the lower retaining jig 11 which is on standby. Subsequently, when the nozzle 33 starts to move up slightly away from the other slot opening 4, the lower retaining jig 11 starts to rotate, and rotates by a predetermined angle so as to pull the wire W towards the outside while the nozzle 33 is rising. Next, the wire W slips off and the nozzle 33 reaches a highest point. After the wire W has slipped off, the lower retaining jig 11 returns to its original standby state. Next, the nozzle 33 displaces in the opposite horizontal direction to return to its original starting point.

In this way, the nozzle 33 traces a complete closed loop, and the wire W is wound once on the winding part 3 of the stator 1 by one rotation of the retaining jigs 11. Thereafter, plural turns of the W are wound on the winding part 3 by repeating the above actions so as to form the coil 6. When the wire W is wound on the winding part 3 of the next slot, the stator 1 rotates in a horizontal direction to a position corresponding to the retaining jig 11.

Next, the action of the core guide 21 during the sequence of movements of the shaft 32 and retaining jig 11 will be described. As shown in FIG. 1 and FIG. 5, the nozzle 33 is situated on the highest point, and the wire W fed out from the nozzle 33 is held by the retaining part 15 of the retaining jig 11, and pulled in the outer circumferential direction of the stator 1 due to its rotation. At this time, the wire W which has just been fed out from the nozzle 33 is temporarily held on an edge face 25 above the core guide 21. Subsequently, due to the motion of the wire W in the outer circumferential direction, the wire W displaces the edge face 25 above the core guide 21 while slipping toward the opening part 22, and is guided from the slot opening 4 to the slot 2a along the inclined surface of the edge piece 24. At this time, as the arc 25a is formed on both edges of the upper edge face 25, the wire W is not damaged as the upper edge face 25 is moving towards the opening part 22. Further, the edge piece 24 is formed on a curved surface, so the wire W is guided smoothly into the slot 2a.

After the wire W has been taken in the outer circumferential direction by the retaining jig 11, the nozzle 33 drops directly downwards. At this time, the wire W paid out from this nozzle 33 first strikes an inner wall 21a of the core guide 21 while it is falling, and pulled by the retaining jig 11 so that it displaces towards the opening part 22, it is inserted into the slot 2a and moves towards the lower part of the slot 2a. The nozzle 33 reaches the lowest point, and changes direction to move horizontally. After reaching an inner wall 21b on the opposite side of the opening part 22 shown by the double dotted line in FIG. 5, the wire W is held by the lower cam plate 12, and when it is pulled in the outer circumferential direction, in the same way as in the above case, it moves towards the opening part 22 while in contact with the lower edge face 25 of the core guide 21, and is guided into the adjacent slot 2b.

After winding of one of the winding parts 3 is complete, the core guide 21 or the core itself rotates by a predetermined angle so as to wind the wire W on the next winding part 3.

Subsequently, this sequence of actions is repeated by the recycling action of the nozzle 33, and the wire W is smoothly and surely wound on the winding part 3 between the two adjacent slots 2a,2b. Also, as the edge face 23 of the core guide 21 slightly protrudes toward the slot opening 4 from the projection 5 of the slot 2, when the wire W is paid out from the nozzle 33 and guided into the slot 2, it is directly inserted into the slot 2 without coming in contact with the projection 5, so damage due to the projection 5 is prevented.

If the retaining jig 11 is in a predetermined position and the cam plate 12 merely rotates in the up/down direction, there is a risk that the wire cannot be wound at an even thickness in the slot 2, and the wire may become thick at certain places so that scatter occurs in the thickness of the wire W. In this case, the retaining jig 11 can be gradually rotated and pivoted back and forth in the radial direction during winding so as to obtain a uniform winding thickness in the slot 2.

Hence, the winding device for a motor stator according to this embodiment comprises the retaining part 15 which moves together with the nozzle 33 which displaces along a predetermined path, and holds the wire W paid out from the nozzle 33, the retaining jig 11 comprising a displacing means 13 which guides the wire W in the outer circumferential direction of the stator 1 while it is held, a release means 15a which releases the hold on the wire W transported to a predetermined position in the outer circumferential direction by the displacing means, and the core guide 21 which is disposed facing the slot opening 4 of the stator 1, and guides the wire W into the slot opening 4 when the wire W is transported in the outer circumferential direction while it is held by the retaining jig 11.

Therefore, the wire W can be wound on the winding part 3 when it is pulled towards the outer circumference of the slot 2 which is distant from the slot opening 4 simply by displacing the nozzle 33 in the up/down and horizontal directions in the vicinity of the slot opening 4, and can be wound evenly from the slot opening 4 in the slot 2 towards the outer circumference. Therefore, a space in which the wire W cannot be wound in the slot 2, which necessarily occurred in the prior art to allow passage of the nozzle 33, does not appear.

As a result, as the wire W can also be wound in the space in which it could not be wound in the prior art, the winding surface area of the coil 6 shown in FIG. 5 is enlarged, and output can be increased. In other words, high output can be obtained from a compact motor.

In particular, when the wire W is displaced in the outer circumferential direction relative to the slot opening 4 of the stator 1 while it is held, the core guide 21 is provided which guides the wire W into the slot opening 4, so the wire W can be smoothly and surely inserted in the slot 2 from the slot opening 4 of the stator 1 and wound without damaging the wire W.

The core guide 21 is formed in a cylindrical shape, and the opening part 22 is provided in the length direction of this cylinder, so it can be manufactured by a simple shape and construction.

Figure 6:
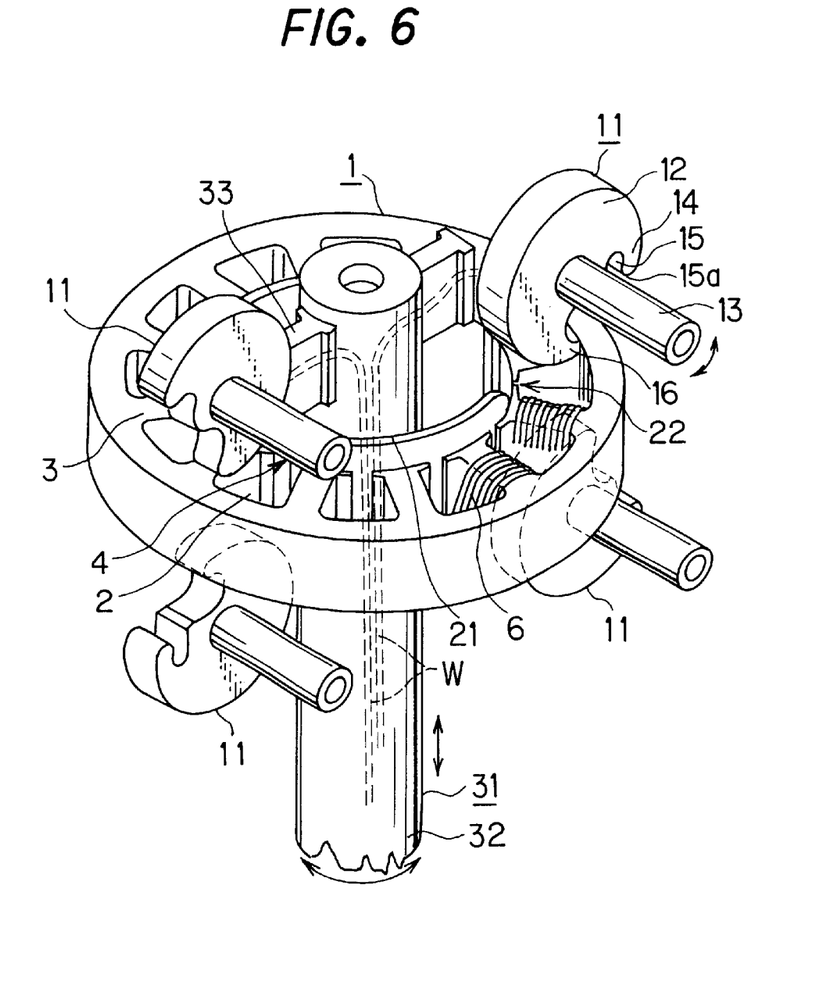
FIG. 6 is a perspective view showing the wire windings device for the motor stator according to a second of this invention.
Figure 7:
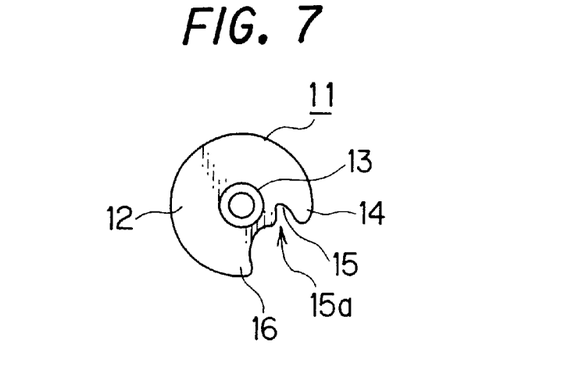
FIG. 7 is a front view of the retaining jig in FIG. 6.

Next, a winding device according to a second embodiment is shown in FIG. 6 and FIG. 7. In these figures, in the retaining jig 11 of the aforesaid embodiment, a hook-shaped pressure piece 16 is further provided facing the hook 14 of the cam plate 12. The core guide 21 and other parts are formed in the same way as in the aforesaid embodiment.

In the retaining jig 11, the pressing piece 16 is formed in the cam plate 12 in addition to the hook 14, so one strand or plural strands of the wire W which is paid out from the nozzle 33 and held on the upper surface or lower surface of the winding part 3 can be pressed in the outer circumferential direction of the stator 1 during winding, and the uniform winding of the wire in the slot is further enhanced.

Figure 8:
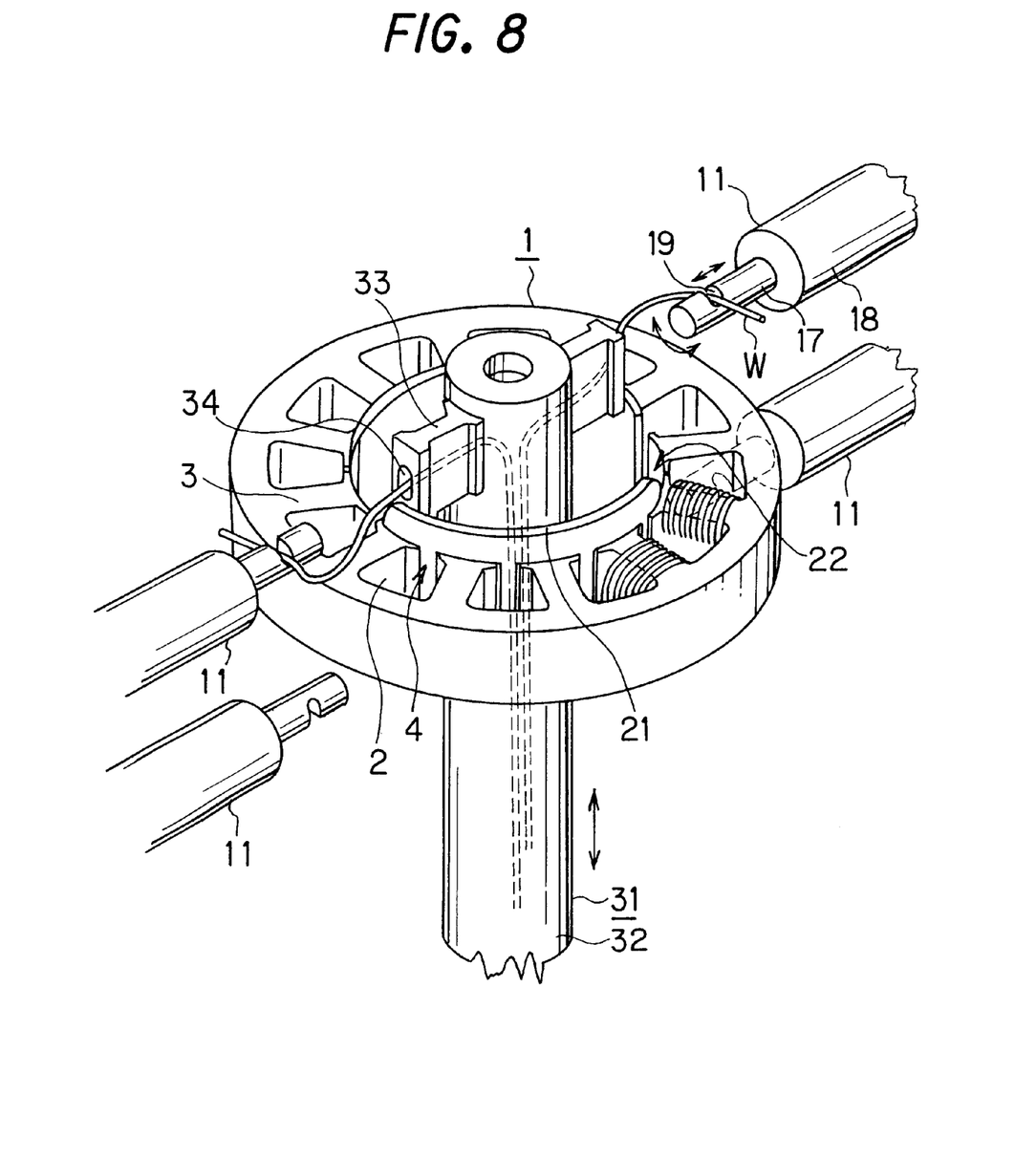
FIG. 8 is similar to FIG. 1, but showing a perspective view of the wire winding device for a motor stator according to a third embodiment.

Next, a third embodiment will be described referring to FIG. 8. In the figure, a guide rod 17 forming the retaining jig 11 is attached free to move back and forth inside a cylindrical member 18. The guide rod 17 moves forward and backwards in the radial direction of the stator 1 together with the motion of the nozzle 33, and rotates back and forth by a predetermined angle around the central axis. A holding depression 19 which temporarily holds the wire W is formed at the end of the guide rod 17. The core guide 21 which is disposed in the center space of the stator 1 has an identical construction to that of the aforesaid embodiment.

When the wire W is wound using the retaining jig 11, the guide rod 17 moves forward toward the stator 1 together with the action of the nozzle 33 which repeatedly traces a quadrilateral path as in the aforesaid embodiment. The wire W is held in the holding depression 19 as it moves forward, and then rotates around the center axis while retreating toward the cylindrical member 18. Due to this, the upward-facing holding depression 19 faces downwards obliquely, and the wire W, which was held, falls down. Therefore, as in the case of the retaining jig 11 comprising the cam plate 12 of the aforesaid embodiments, the wire W can be wound while pulling it towards the rear of the slot 2, the wire W can be wound to a uniform thickness without passing the nozzle 33 inside the slot 2, and as a space where the wire W cannot be wound does not occur, the output of the motor can be increased.

In the core guide 21 of the aforesaid embodiments, the opening parts 22 were formed in two positions corresponding to the number of the nozzles 33, but they do not necessarily have to correspond to the number of the nozzles 33.

The core guide 21 was formed as a cylinder, and the opening parts 22 were formed in its length direction, but this invention is not limited to this arrangement. Specifically, it is sufficient if the wire W paid out from the nozzle 33 can be guided smoothly and surely from the slot opening 4 into the slot 2 when the wire W is pulled in the outer circumferential direction.

Figure 9:
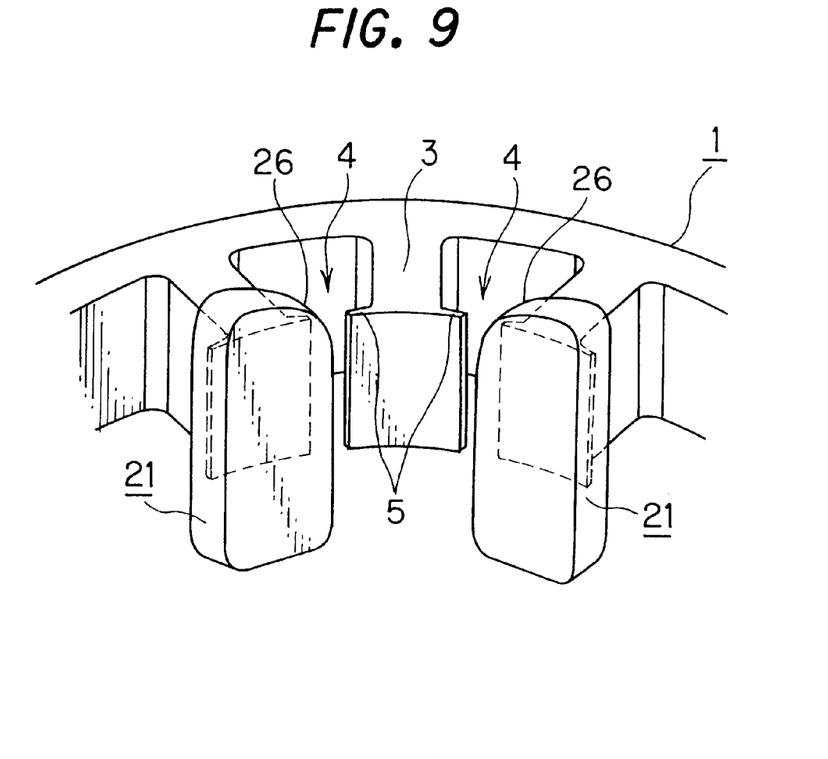
FIG. 9 is similar to FIG. 1, but showing a perspective view of the wire winding device for a motor stator according to a fourth embodiment.
Figure 10:
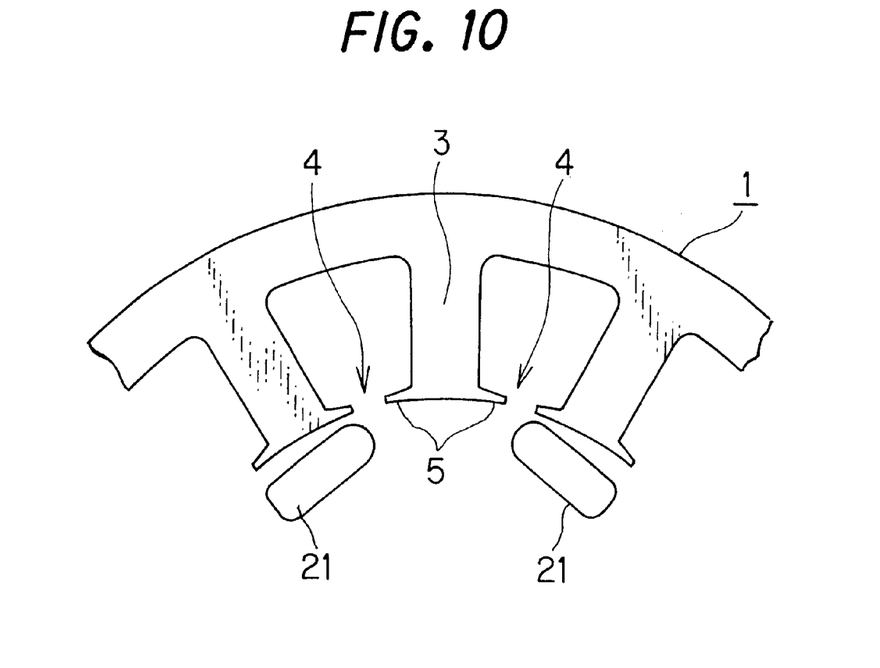
FIG. 10 is a plan view showing the wire winding device of FIG. 9.
Figure 11:
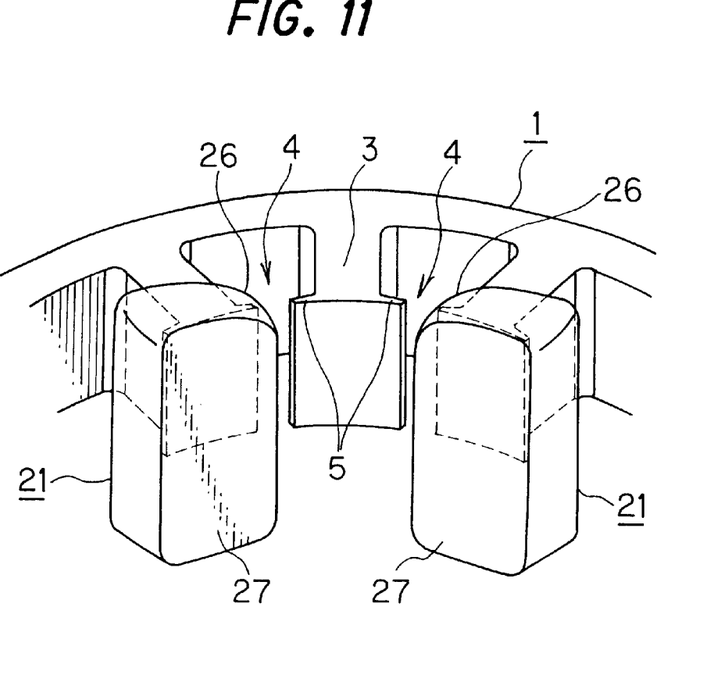
FIG. 11 is similar to FIG. 1, but showing a perspective view showing the wire winding device for a stator according to a fifth embodiment.

For example, as shown in FIG. 9 and FIG. 10, the core guide 21 may be formed as a pair of longitudinal plates disposed in adjacent slot openings 4. In this case, the angle piece 26 of the core guide 21 is curved so that the wire W can be smoothly inserted into the slot opening 4.

Figure 12:
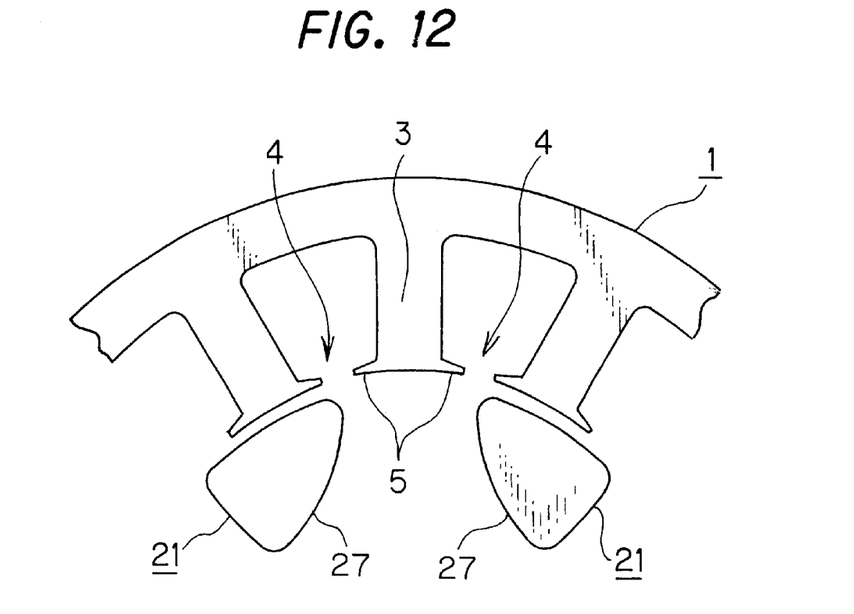
FIG. 12 is a plan view showing the wire winding device of FIG. 11.

The core guide 21 may also be formed with a slanting surface 27 facing towards the center of the stator 1, as shown in FIG. 1 1and FIG. 12. In this case, the wire W can be inserted with even greater smoothness. As shown in FIG. 9 to FIG. 12, two of the core guide 21 may form a pair, and plural pairs disposed in the center space 1b of the stator 1.

The wire W was pulled in the outer circumferential direction of the slot 2 of the stator 1 by using the retaining jig 11 comprising the cam plate 12 or the retaining jig 11 comprising the guide rod 17, but this invention is not limited to this arrangement, and various means may be used to pull the wire W in the outer circumferential direction of the stator 1 in synchronism with the motion of the nozzle 33, and to release the hold on the wire.

The retaining jigs 11 in the aforesaid embodiments were disposed above and below the stator 1, but they may be provided only above or below the stator 1 if the wire W can be wound uniformly.

Figure 13:
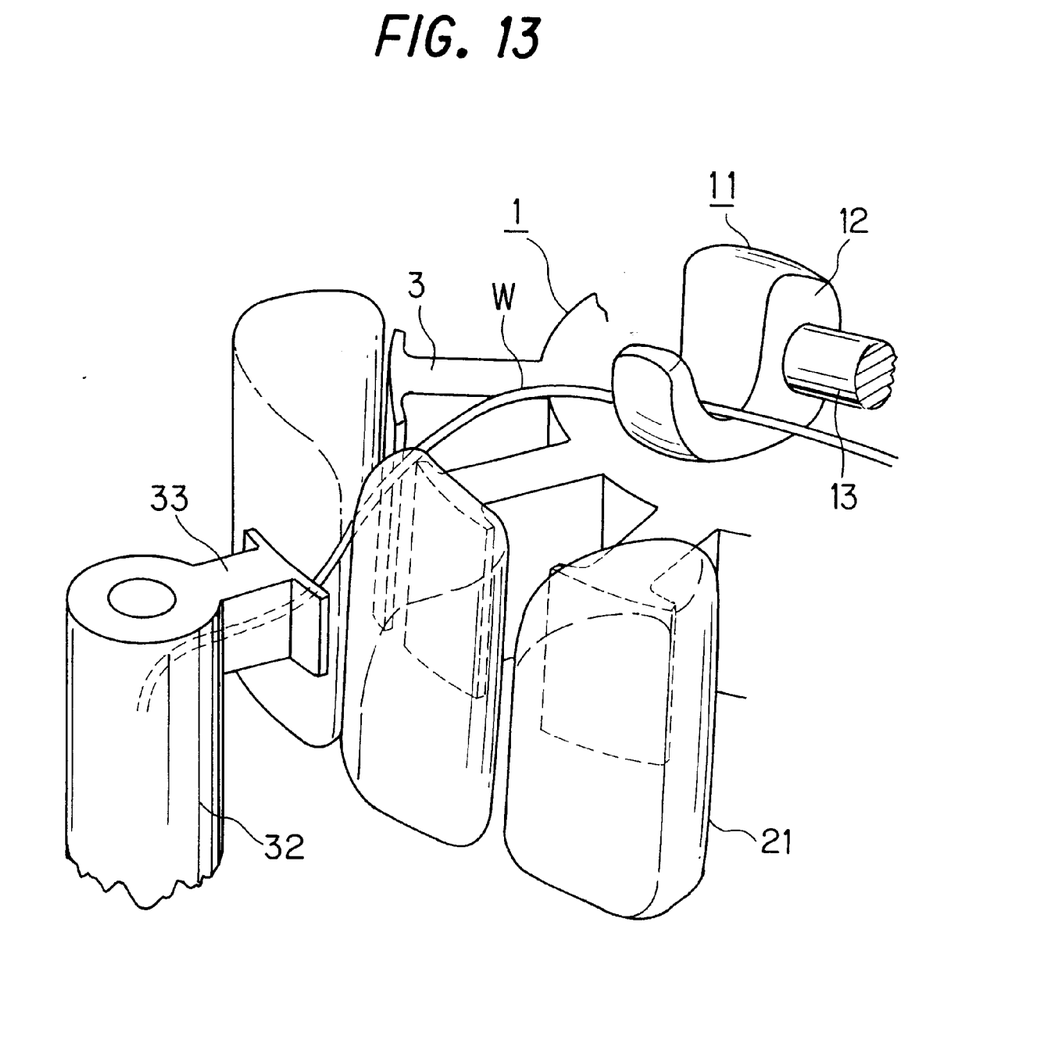
FIG. 13 is similar to FIG. 1, but showing a perspective view showing the wire winding device for a motor stator according to a sixth embodiment.
Figure 14:
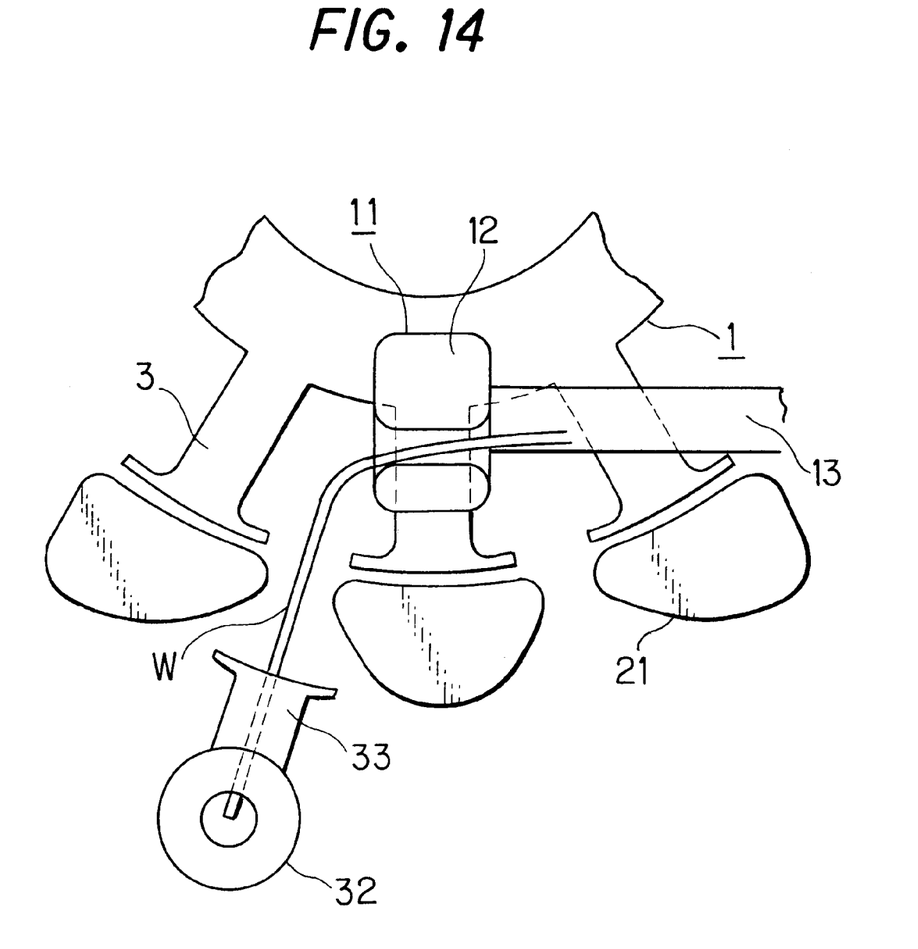
FIG. 14 is a plan view showing the wire winding device of FIG. 13.

In the aforesaid embodiments, an inner winding device was shown wherein the nozzle 33 was disposed in the center space 1b of the stator 1 and the wire was wound from the inside towards the winding part 3, however they may be applied also to an outer winding device shown in FIG. 13 and FIG. 14 wherein the nozzle 33 is disposed outside the stator 1. In this case, the wire W is wound on the winding part 3 in the same way as in inner winding, the wire being held and released by the retaining jig 11 disposed inside the stator 1 from the nozzle 33 disposed outside the stator 1. In this case also, the retaining jig 11 and core guide 21 are not limited to those shown in the drawing.

To drive the retaining jig 11, various means may be used such as a cam, cylinder, rack and pinion, or servomotor.

To obtain synchronism with the motion of the nozzle 33, in addition to a link mechanism or position detecting sensor, various means may be used.

As described above, according to this invention, a wire paid out from a nozzle which performs a cyclic motion is held by a retention jig which moves together with the nozzle, the wire thus held is transported in the outer circumferential direction while being guided into a slot opening of a motor stator, and the hold on the wire is released after transporting it to a predetermined position. By repeating this sequence of operations, the wire can be wound on the motor stator.

Therefore, simply by moving the nozzle in the up/down and horizontal directions in the vicinity of the slot opening, the wire can be wound on a winding part 1 while pulling it towards the outside of the slot distant from the slot opening, and as it can be wound uniformly without passing the nozzle through the slot opening in the slot on the outer circumference, a space where the wire W cannot be wound in the slot, which was always created in the prior art to pass the nozzle through, does not occur. As a result, the wire can be wound even in this space created in the prior art, the cross-sectional surface area of the coil can be increased, and high output can be obtained from a compact motor.

In particular, a guide is provided facing the slot opening of the motor stator to guide the wire into the slot opening when the wire is transported in the outer circumferential direction while it is held, so the wire can be smoothly and surely inserted into the slot from the slot opening of the motor stator without damaging the wire.

What is claimed is:

1. A winding method for a motor stator, comprising;

holding a wire supplied from a nozzle which moves in a predetermined path, by a retaining jig which moves in synchronism with the nozzle;

guiding the wire held by the retaining jig to a predetermined position along a core guide, and using the core guide to guide the wire into a slot opening in the motor stator, the core guide facing the slot opening, the slot opening being formed between adjacent, inwardly projecting winding parts of the motor stator, the core guide being disposed between the nozzle and the winding parts;

releasing the wire which is held by the retaining jig so as to wind the wire around one of the adjacent, inwardly projecting winding parts;

after the wire is wound around the one of the adjacent, inwardly projecting winding parts, rotating the core guide relative to the motor stator so that the core guide faces another slot opening, and so that the wire can be wound on another one of the inwardly projecting winding parts; and repeating this sequence of operations to wind the wire around the winding parts.

2. A winding device for a motor stator, comprising;

a retaining jig which comprises a retaining part which moves together with a nozzle which displaces along a predetermined path, the retaining part holding a wire supplied from the nozzle, the retaining jig further including release means for releasing the hold on the wire at a predetermined position;

transport means for guiding the wire thus held in an outer circumferential direction of the motor stator and to the predetermined position; and a core guide which guides the wire into a slot opening in the motor stator when the wire is at the predetermined position, the slot opening being formed between adjacent, inwardly projecting winding parts of the motor stator, the core guide facing the slot opening, and being disposed between the winding parts and the nozzle, said core guide being rotatable relative to said motor stator so that after the wire is wound around one of the adjacent, inwardly projecting winding parts, said core guide can be repositioned to allow the wire to be wound on another one of the inwardly projecting winding parts.

3. A winding device for a motor stator as defined in claim 2, wherein the retaining jig further includes a cam plate which moves in synchronism with the nozzle, and rotates back and forth around a rotation axis of the retaining jig, the retaining part being provided on an edge of the cam plate and moving the wire to the predetermined position where it releases the wire due to a back and forth rotation of the cam plate.

4. A winding device for a motor stator as defined in claim 3, wherein the retaining jig further includes a pressing piece which presses the wire in the outer circumferential direction of the motor stator due to the back and forth rotation of the cam plate.

5. A winding device for a motor stator as defined in claim 2, wherein the retaining jig comprises a guide rod which displaces in synchronism with the motion of the nozzle and retreats in a radial direction of the motor stator, and the retaining part comprises a notch which is provided in the guide rod and rotates to release the hold on the wire.

6. A winding device for a motor stator as defined in claim 2, wherein when the transport means guides the wire in the outer circumferential direction of the motor stator and to the predetermined position, the wire is displaced along an upper edge of the core guide.

7. A winding device for a motor stator as defined in claim 2, wherein the core guide has an upper surface and an edge surface, and a curved transition connecting the upper surface to the edge surface, the curved transition smoothly guiding the wire into the slot opening when the wire is at the predetermined position.

8. A winding device for a motor stator, comprising;
   a retaining jig which comprises a retaining part which moves together with a nozzle which displaces along a predetermined path, the retaining part holding a wire supplied from the nozzle, the retaining jig including a cam plate which moves in synchronism with the nozzle, and rotates back and forth around a rotation axis of the retaining jig, the retaining part being provided on an edge of the cam plate and moving the wire to a predetermined position where it releases the wire due to a back and forth rotation of the cam plate, the retaining jig further including a pressing piece which presses the wire in an outer circumferential direction of the motor stator due to the back and forth rotation of the cam plate;

transport means for guiding the wire thus held in the outer circumferential direction of the motor stator and to the predetermined position;

release means for releasing the hold on the wire guided to the predetermined position; and a core guide which guides the wire into an opening in the motor stator when the wire, held by the retaining jig disposed facing the opening, is guided in the outer circumferential direction of the motor stator, the opening being formed between adjacent, inwardly projecting winding parts of the motor stator, said core guide being rotatable relative to said motor stator so that after the wire is wound around one of the adjacent, inwardly projecting winding parts, said core guide can be repositioned to allow the wire to be wound on another one of the inwardly projecting winding parts.

* * * * *